United States Patent
Stock et al.

(10) Patent No.: US 7,103,454 B2
(45) Date of Patent: Sep. 5, 2006

(54) PROCESS FOR RECOGNIZING THE MOVEMENT OF A MOTOR VEHICLE

(75) Inventors: Burkhard Stock, Lübeck (DE); Henning Thomsen, Lübeck (DE); Günter Wahlbrink, Rehhorst (DE)

(73) Assignee: Dräger Safety AG & Co. KGaA, (DE)

( * ) Notice: Subject to any disclaimer, the term of this patent is extended or adjusted under 35 U.S.C. 154(b) by 253 days.

(21) Appl. No.: 10/644,688

(22) Filed: Aug. 19, 2003

(65) Prior Publication Data

US 2004/0088096 A1 May 6, 2004

(30) Foreign Application Priority Data

Nov. 4, 2002 (DE) ................. 102 51 281

(51) Int. Cl.
*G06F 17/14* (2006.01)

(52) U.S. Cl. ............... 701/1; 701/47; 340/429; 340/426.24; 340/426.25; 340/441; 340/658; 180/272

(58) Field of Classification Search .............. 701/1, 701/47; 340/429, 426.24, 426.25, 441, 933, 340/657, 658; 180/272
See application file for complete search history.

(56) References Cited

U.S. PATENT DOCUMENTS 3,710,082 A * 1/1973 Sloane et al. ............. 700/280
4,114,450 A * 9/1978 Shulman et al. .............. 73/489
4,413,522 A * 11/1983 Leatherwood et al. ........ 73/646
5,433,111 A * 7/1995 Hershey et al. ............... 73/593
5,463,998 A * 11/1995 Denz et al. .................. 123/520
5,903,856 A * 5/1999 Rompe ....................... 702/176
6,198,996 B1 * 3/2001 Berstis ........................ 701/36
6,759,952 B1 * 7/2004 Dunbridge et al. ......... 340/444
2002/0039951 A1 4/2002 Hasegawa ................... 477/183
2004/0117082 A1 * 6/2004 Bidou et al. .................. 701/33

FOREIGN PATENT DOCUMENTS

DE 42 13 222 A1 10/1993
DE 101 10 493 A1 9/2002
EP 1 188 625 A2 3/2002

* cited by examiner

Primary Examiner—Thomas G. Black
Assistant Examiner—Brian J. Broadhead
(74) Attorney, Agent, or Firm—McGlew & Tuttle, PC

(57) ABSTRACT

A process and system are provided for recognizing the movement of a motor vehicle as well as a process for using an acceleration sensor in a device for blocking the starting of a motor vehicle. Reliable information is obtained on whether or not the motor vehicle was moved. In the process for recognizing the movement of a motor vehicle, the accelerating forces acting on the motor vehicle are measured for this purpose as time-dependent functions and are subjected to a discrete Fourier analysis. If the majority of the frequencies determined is below a preset limit frequency, e.g., 0.3 Hz, movement of the motor vehicle is assumed, and an irrelevant vibration is otherwise assumed. An acceleration sensor is used in a device for blocking the starting of a motor vehicle and/or to demonstrate an inadmissible circumventing of the blocking.

7 Claims, 5 Drawing Sheets

PROCESS FOR RECOGNIZING THE MOVEMENT OF A MOTOR VEHICLE

FIELD OF THE INVENTION

The present invention pertains to a process for recognizing the movement of a motor vehicle as well as to the use of an acceleration sensor in a device for blocking the starting of a motor vehicle.

BACKGROUND OF THE INVENTION

Interlock systems, which are to prevent the unauthorized starting of the motor vehicle, are installed in motor vehicles. Starting is unauthorized, e.g., if a motor vehicle is stolen or the user of the motor vehicle is under the influence of alcohol. In the latter case, the starter in a motor vehicle with an interlock system installed can be actuated only when the user had previously undergone a breath alcohol test and the value measured in the test is below a certain limit value. Since such a breath alcohol test is not intended to be a breath alcohol test performed by the police within the framework of a traffic check, attempts at deception cannot be ruled out, in which the breath alcohol test is circumvented or the motor vehicle is pushed or started by another person, even though the value measured in the breath alcohol test is above the limit value. Such attempts of deception represent a violation of the legal conditions, have far-reaching consequences for the person involved and must therefore be reliably identified or ruled out.

Prior-art interlock systems monitor, e.g., the vehicle system voltage in the motor vehicle, doing so even when the motor vehicle is stopped and the ignition is not turned on. However, a sample is requested for the breath alcohol test only after the ignition had been turned on. The drop in the vehicle system voltage during the start-up of the motor vehicle is used here as a criterion of whether or not a start has taken place. If a drop in the vehicle system voltage is indeed registered when the breath alcohol test has not been passed, an entry is made in the memory of the interlock system, which is read, e.g., by an inspection station at monthly intervals. However, the detection of the vehicle system voltage is not a reliable criterion for the question of whether the motor vehicle was started or not, because a drop in the vehicle system voltage may also be caused by turning on an air conditioner, a radio, windshield wipers or a fan in the motor vehicle.

Another possibility of demonstrating the unauthorized starting of a motor vehicle is described in U.S. Ser. No. 2002/0039951 A1. An acceleration sensor with a control means for the ignition and the fuel supply is used there on a motorcycle. The acceleration sensor also takes into account the gravitational acceleration and, in a preferred embodiment, it is able to measure the accelerations in two directions directed at right angles to one another. Signal noise and vibrations, which shall be left out of consideration, are eliminated by a downstream filter.

SUMMARY OF THE INVENTION

The object of the present invention is to provide a process with which reliable information can be obtained on whether a motor vehicle was moved or not.

According to the invention, a process is provided for recognizing the movement of a motor vehicle. The accelerating forces acting on the motor vehicle are measured at a preset time interval by an acceleration sensor as time-dependent functions and sent to a evaluating and control unit. The evaluating and control unit determines a frequency spectrum of the functions on the basis of a Fourier analysis. If a preset percentage of the frequency spectrum is below a set limit frequency, the evaluating and control unit stores information indicating that the motor vehicle was moved. If the preset percentage of the frequency spectrum is not below the set limit frequency, the evaluating and control unit stores information indicating that the motor vehicle was not moved.

In a process for recognizing the movement of a motor vehicle, the accelerating forces are measured by an acceleration sensor as time-dependent functions and sent to an evaluating and control unit. The time-dependent functions are subjected there to a Fourier analysis, also called harmonic analysis. The corresponding frequency spectrum can thus be determined. If a preset percentage of the frequency spectrum is below a set limit frequency, the evaluating and control unit stores information that the motor vehicle was moved. If this condition is not met, i.e., the preset percentage of the frequency spectrum is not below the set limit frequency, the evaluating and control unit stores information that the motor vehicle was not moved.

In a preferred embodiment of the process, the accelerating forces acting on the motor vehicle are measured by the acceleration sensor in at least two mutually independent directions. It is ensured in this manner that one component of the accelerating forces is detected in the horizontal direction. The acceleration sensor can therefore be installed in the motor vehicle without regard to a special orientation in space.

Depending on whether a continuous or discrete frequency spectrum is desired, the time-dependent functions of the accelerating forces are subjected to a continuous or discrete Fourier transformation. A discrete Fourier transformation is sufficient for the purposes of the subsequent assessment of whether or not a motor vehicle was moved and is to be given preference over a continuous Fourier transformation because it can be performed in a comparatively simple manner in an evaluating and control unit.

The limit frequency on the basis of which the decision is made on whether or not the motor vehicle was moved is advantageously set as a function of the spring system and the weight of the motor vehicle. For example, 0.3 Hz is used as the limit frequency for a usual passenger car. A correspondingly lower limit frequency shall be selected in the case of a heavy motor vehicle and in the case of a softer spring system.

For example, a period between 30 sec and 60 sec is recommended as the preset time interval at which the accelerating forces acting on the motor vehicle are measured as time dependent functions.

In case of the use of an acceleration sensor in a device for blocking the starting of a motor vehicle, the accelerating forces measured by the acceleration sensor are evaluated by an evaluating and control unit, e.g., according to the process according to the present invention. Independently here from, the evaluating and control unit receives a user breath alcohol concentration, which is measured by means of a connected handset in the motor vehicle. Depending on the breath alcohol concentration measured, the evaluating and control unit energizes a relay, which will then interrupt or close a circuit to a starter by either opening or closing a corresponding switch.

The measured values for the breath alcohol concentration and the measured values of the accelerating forces acting on the motor vehicle, which were evaluated according to the process according to the present invention, are stored by the evaluating and control unit and made available for inspections at time intervals of about one month.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
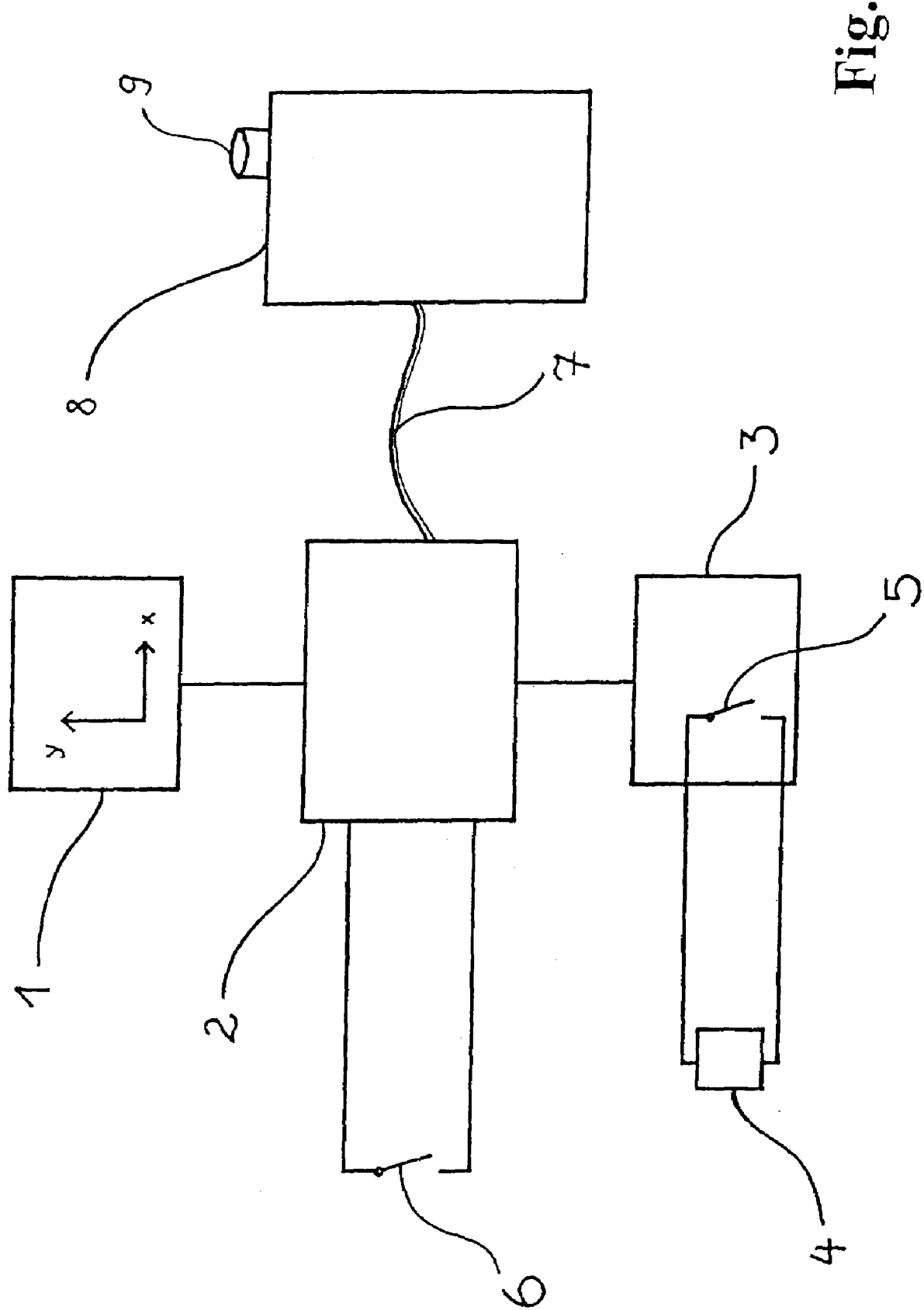
FIG. 1 is a schematic block diagram showing a device for blocking the starting of a motor vehicle.

Referring to the drawings in particular, FIG. 1 shows a device for blocking the starting of a motor vehicle. The device comprises an acceleration sensor 1, which detects the accelerating forces acting on a motor vehicle in two independent directions. Thus, it may be installed, e.g., under the dashboard of a motor vehicle in any orientation, and components of accelerating forces in the horizontal direction are always detected. The measurement of accelerating forces in two mutually independent directions is symbolized by the system of coordinates indicated schematically. The values measured by the acceleration sensor 1 are passed on continuously to an evaluating and control unit 2. The two functions are recorded: The $g_x(t)$ curve showing the changes in the accelerating forces acting on the motor vehicle in the x direction over time and the $g_y(t)$ curve showing the changes in the accelerating forces acting on the motor vehicle in the y direction over time. Two functions $g_x(t)$ and $g_y(t)$ are subjected by the evaluating and control unit 2 to a Fourier analysis each. The Fourier analysis provides information on the frequencies that are involved in the particular accelerating forces. The measured frequency components of the Fourier analysis are below 0.3 Hz in case of movement of the motor vehicle, as it happens during the start or during travel in a curve. Vibrations that lead to frequencies mostly above 0.3 Hz are generated during a shaking movement or a slight shock of the motor vehicle. The assessment as to whether the majority of the frequencies is below or above a preset value, 0.3 Hz in this example, is made in the following manner: The frequencies determined for $g_x(t)$ and for $g_y(t)$ are added up. In the case of a continuous Fourier analysis, the frequency component from 0 Hz to 0.3 Hz and beginning from 0.3 Hz would be integrated. If the frequency component from 0 Hz to 0.3 Hz accounts, e.g., for more than 50% of the total integral, movement of the motor vehicle can be assumed. If the frequency component from 0 Hz to 0.3 Hz accounts for less than 50% of the total integral, movement of the motor vehicle is ruled out. The frequency component from 0 Hz to 0.3 Hz and that beginning from 0.3 Hz would be added up in the case of a discrete Fourier analysis with frequencies at constant distances. If the sum of the frequency component from 0 Hz to 0.3 Hz exceeds the sum of the frequency component beginning from 0.3 Hz, movement of the motor vehicle is assumed in this case as well. If, by contrast, the sum of the frequency component from 0 Hz to 0.3 Hz is smaller than the sum of the frequency component above 0.3 Hz, an irrelevant movement of the motor vehicle, which cannot be brought into connection with its movement, is assumed.

The device for blocking the starting of a motor vehicle will be explained below on the basis of its mode of operation:

The motor vehicle is first started by a user. An ignition switch 6 shown in the open state in FIG. 1 is closed for this purpose. The evaluating and control unit 2 will then activate a handset line 7. The handset 8 is supplied with power and data are exchanged between the handset 8 and the evaluating and control unit 2 via the line 7. The handset 8 is accommodated freely accessibly and movably in the interior of the motor vehicle. The user delivers a breath alcohol sample via a mouthpiece 9 arranged at the handset. If the alcohol concentration in the breath alcohol sample is below a preset limit value, the evaluating and control unit 2 energizes a relay 3, and a switch 5, shown in the opened state in FIG. 1, is closed, so that a starter 4 can be started.

The evaluating and control unit 2 of the device for blocking the starting of a motor vehicle receives and processes both the signals of the handset 8 and those of the acceleration sensor 1. The signals are evaluated, stored and usually read at a corresponding inspection station at monthly intervals. If a breath alcohol sample turns out to be above a preset limit value, but the acceleration sensor measured shortly thereafter accelerating forces that show predominantly frequency components in the range between 0 Hz and 0.3 Hz during the subsequent Fourier analysis, it can be assumed that the motor vehicle was moved, even though the result of the breath alcohol test was positive. This may have far-reaching consequences for the user of the motor vehicle. It is understandable from this that the statement made on whether the motor vehicle was moved or was subject only to a slight shock without any further consequence must be extremely reliable.

Figure 2:
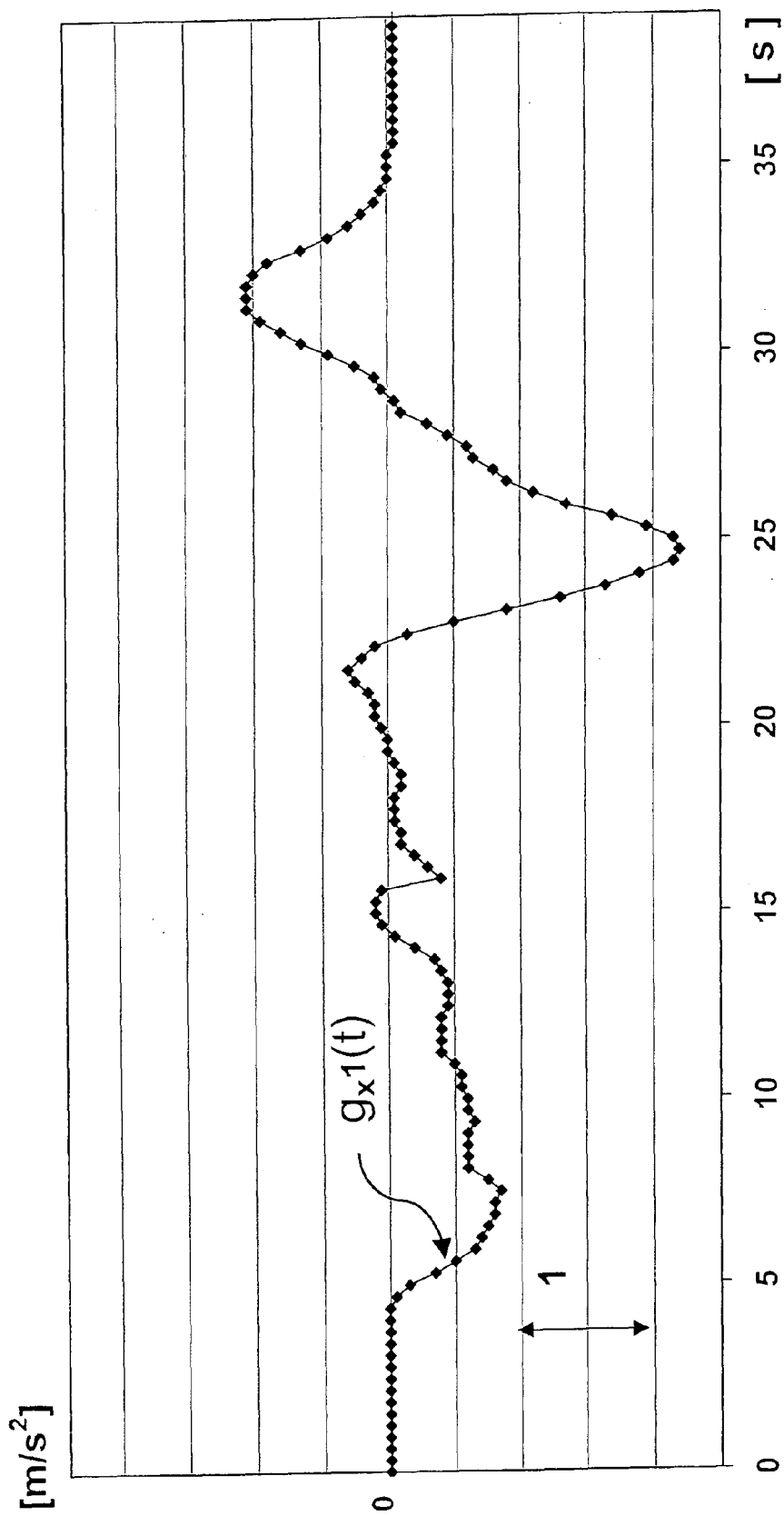
FIG. 2 is a first curve showing the changes in the accelerating forces acting on a motor vehicle over time.

FIG. 2 shows a first $g_{x\,1}(t)$ curve showing the changes over time in the accelerating forces acting on a motor vehicle in a direction x of the two independent directions, which are measured by the acceleration sensor 1 shown in FIG. 1. The time interval on the abscissa is 40 sec, and increments of 5 sec each are shown. The measured accelerating forces in m per square sec are plotted on the ordinate. Two diagonal stripes in FIG. 2 correspond to 1 m/s$^2$ (meter per square second), indicated by the vertical double arrow.

Figure 3:
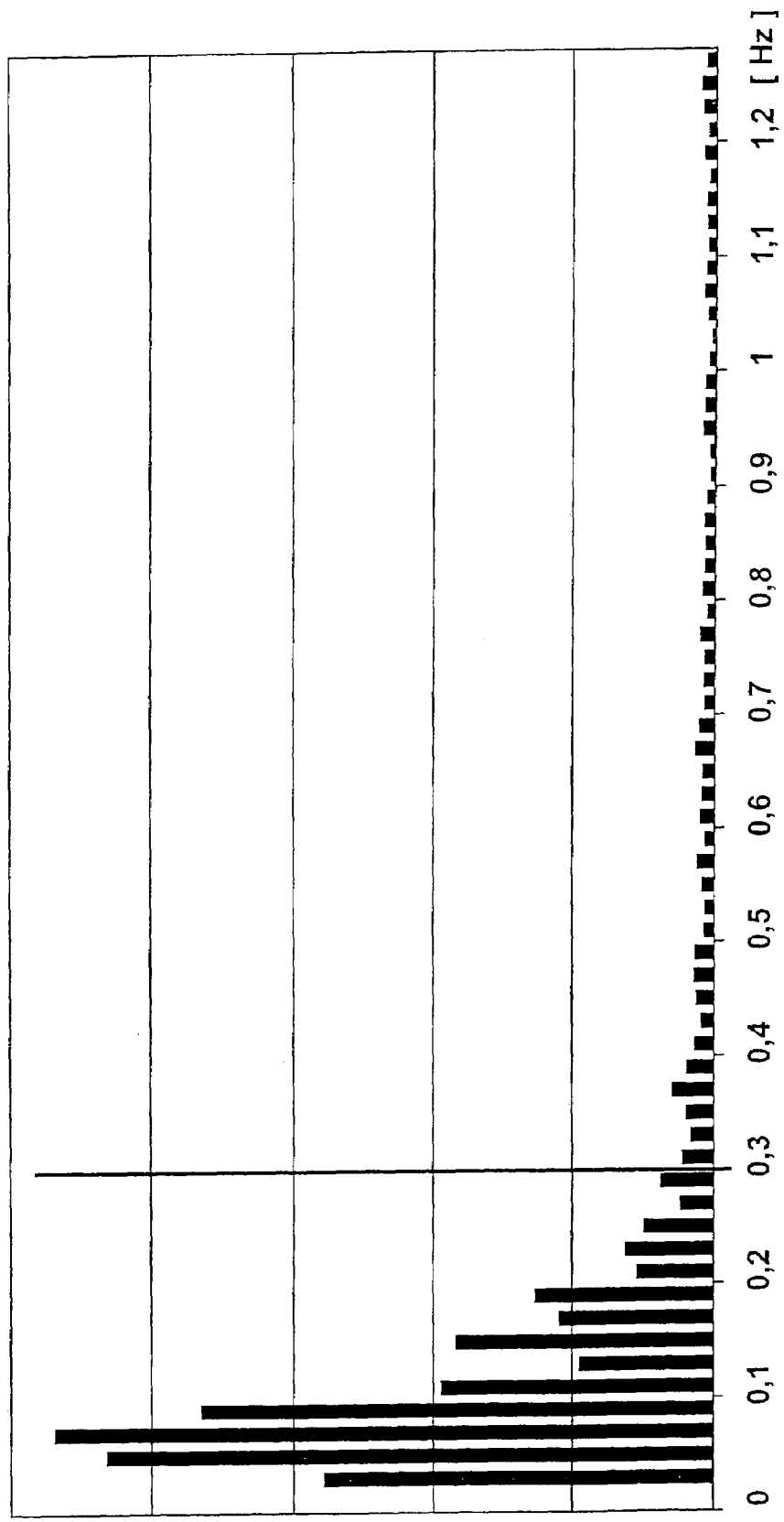
FIG. 3 is a view showing the distribution of the frequencies of a discrete Fourier analysis of the function from FIG. 2.

FIG. 3 shows the distribution of the frequencies of a discrete Fourier analysis of the function $g_{x\,1}(t)$ from FIG. 2. The value of the frequency is plotted in Hz on the abscissa. An increment of 0.02 Hz (Hertz) was selected. The amplitude of the particular frequency is shown in a dimensionless form on the ordinate. The vertical line at 0.3 Hz marks the limit for the decision on whether movement of the motor vehicle took place. This is given here because the majority of the frequencies are below 0.3 Hz. Consequently, there is no shock that is merely insignificant, because the majority of the frequencies would be above 0.3 Hz in this case.

Figure 4:
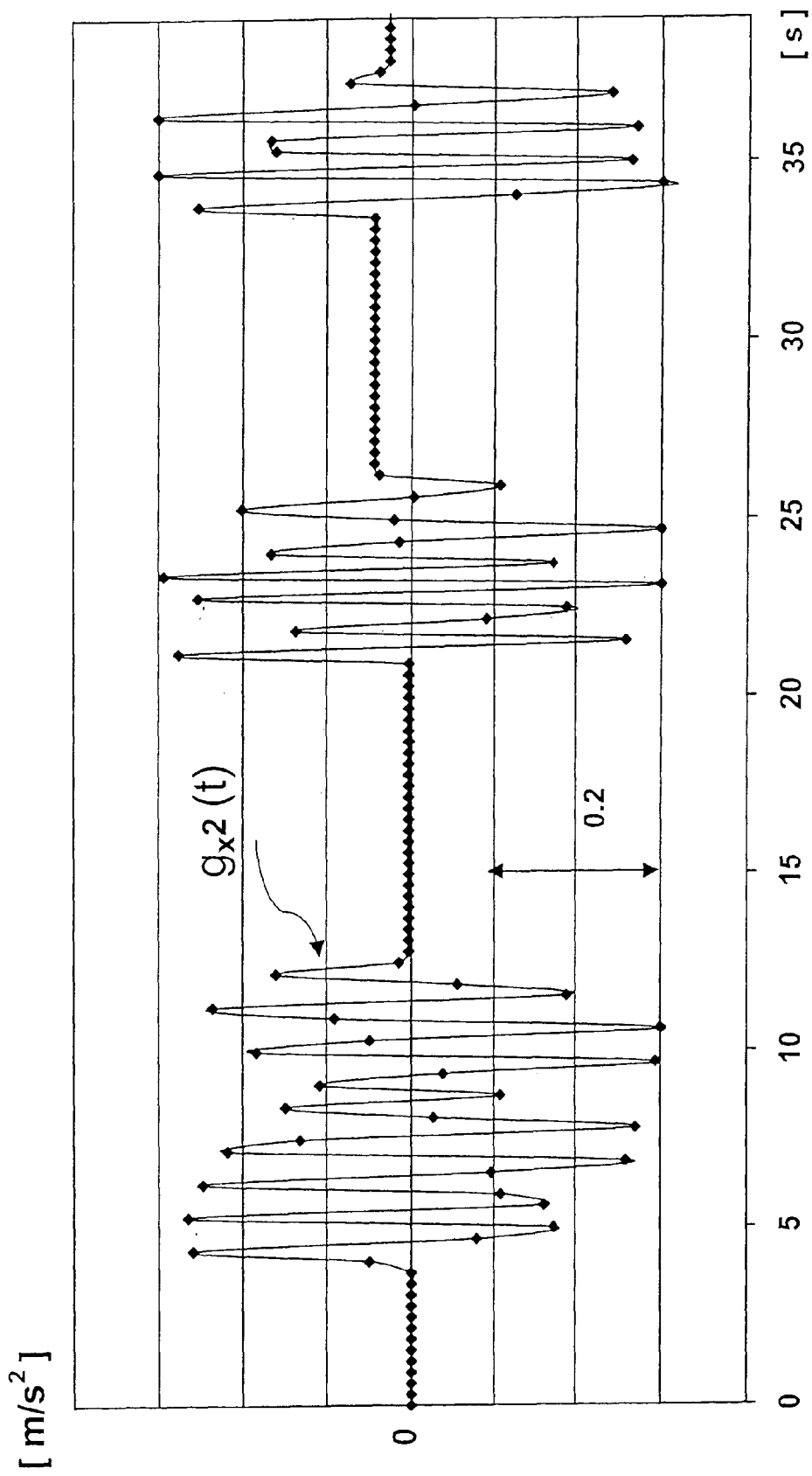
FIG. 4 is a view showing a second curve showing the changes in the accelerating forces acting on a motor vehicle over time.

FIG. 4 shows a second $g_{x\,2}(t)$ curve showing the changes over time in the accelerating forces acting on a motor vehicle in the same manner as FIG. 2. Likewise, 40 sec are plotted on the abscissa at 5-sec increments. The accelerating forces in meter per square second are likewise plotted on the ordinate here. However, two diagonal stripes correspond to 0.2 m/s² here, represented on the basis of a vertical double arrow.

Figure 5:
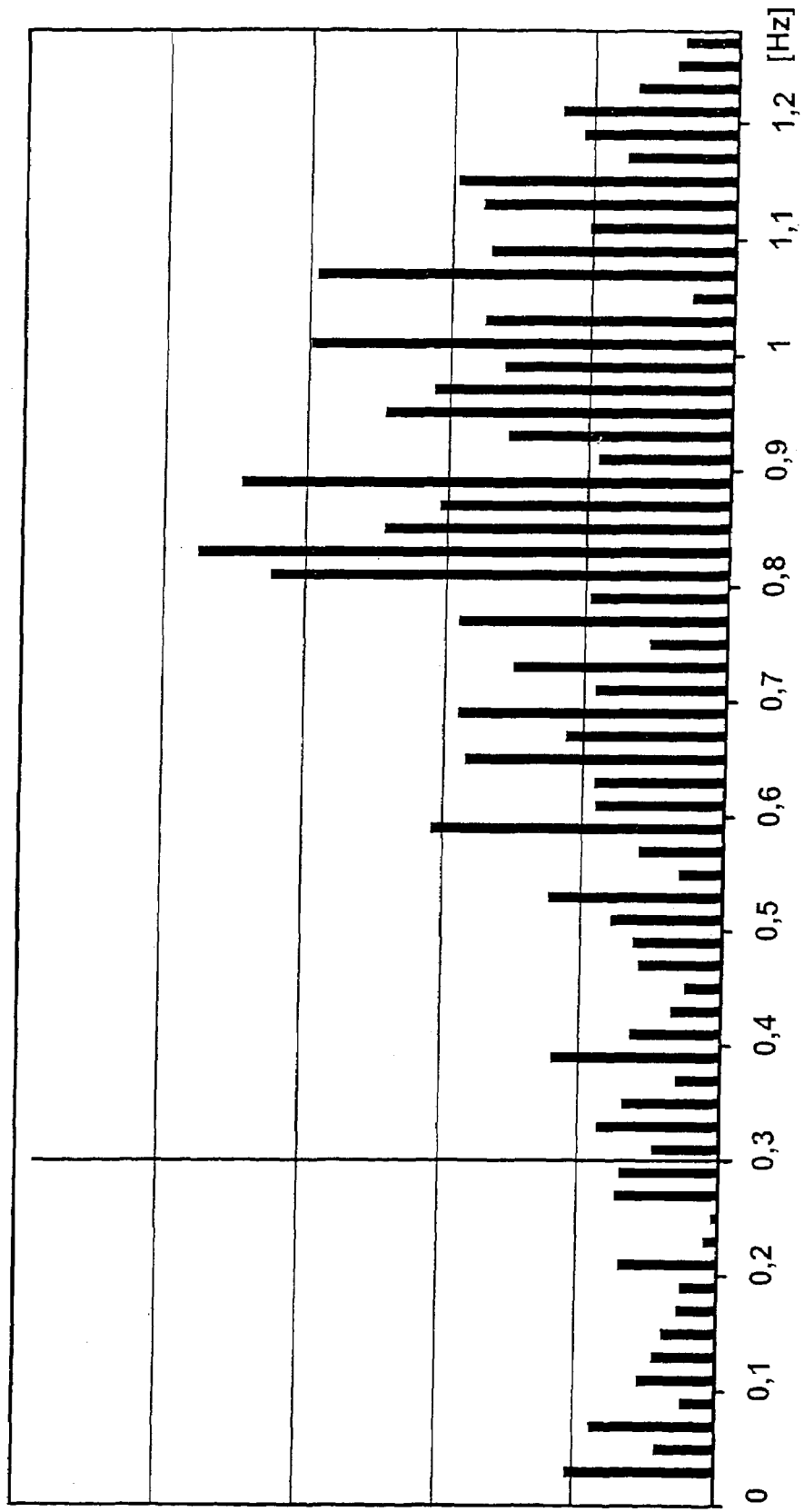
FIG. 5 is a view showing the distribution of the frequencies of a discrete Fourier analysis from FIG. 4.

FIG. 5 shows the distribution of the frequencies of a discrete Fourier analysis of the function $g_{x\,2}(t)$ from FIG. 4. As in FIG. 3, the frequency is plotted on the abscissa at 0.02 Hz increments in this case as well. The amplitude of the particular frequency is plotted on the ordinate. The majority of the frequencies are above 0.3 Hz here, i.e., to the right of the vertical limit line at 0.3 Hz. A shaking movement of the motor vehicle rather than its movement is assumed in this case.

While a specific embodiment of the invention has been shown and described in detail to illustrate the application of the principles of the invention, it will be understood that the invention may be embodied otherwise without departing from such principles.

What is claimed is:

1. A process for recognizing the movement of a motor vehicle comprising the steps:
   measuring the accelerating forces acting on the motor vehicle at preset time intervals by a acceleration sensor as time-dependent functions and sending the functions to an evaluating and control unit;
   determining a frequency spectrum of the functions with the evaluating and control unit on the basis of a Fourier analysis;
   if a preset percentage of the frequency spectrum is below a set limit frequency, storing, with the evaluating and control unit, information indicating that the motor vehicle was moved; and
   if the preset percentage of the frequency spectrum is not below the set limit frequency, storing, with the evaluating and control unit, information indicating that the motor vehicle was not moved.

2. A process in accordance with claim 1, wherein the accelerating forces acting on the motor vehicle are measured by the acceleration sensor in at least two mutually independent directions.

3. A process in accordance with claim 1, wherein the frequency spectrum is determined on the basis of a discrete Fourier analysis.

4. A process in accordance with claim 1, wherein the limit frequency is a function of the spring system and the weight of the motor vehicle.

5. A process for using an acceleration sensor in a device for blocking the starting of a motor vehicle, the process comprising:
   providing an evaluating and control unit and an acceleration sensor;
   measuring the accelerating forces acting on the motor vehicle with the acceleration sensor;
   using the evaluating and control unit to evaluate the accelerating forces acting on the motor vehicle to provide an indication as to whether the motor vehicle has been moved or not during a time the accelerating forces were measured;
   providing a handset connected to the evaluating and control unit by which a breath alcohol concentration of a user is measured and is sent as a signal to the evaluating and control unit;
   activating a relay or switch by the evaluating and control unit for either interrupting or closing a circuit to a starter of the motor vehicle as a function of the signal by opening or closing a switch wherein said step of using the evaluating and control unit includes receiving signals from the acceleration sensor and analyzing the signals to determine a frequency spectrum of the signals with the evaluating and control unit on the basis of a Fourier Analysis.

6. A process according to claim 5, wherein on the basis of the Fourier Analysis if a preset percentage of the frequency spectrum is below a set limit frequency the evaluating and control unit stores information indicating that the motor vehicle has moved and if the preset percentage of the frequency spectrum is not below the set limit frequency the evaluating and control unit stores information indicating that the motor vehicle was not moved.

7. A system for blocking the starting of a motor vehicle, the system comprising:
   an acceleration sensor measuring the accelerating forces acting on the motor vehicle with the acceleration sensor at preset time intervals as time-dependent functions;
   an evaluating and control unit receiving the functions from the acceleration sensor and determining a frequency spectrum of the functions with the evaluating and control unit on the basis of a Fourier analysis wherein if a preset percentage of the frequency spectrum is below a set limit frequency the evaluating and control unit stores information indicating that the motor vehicle was moved; and if the preset percentage of the frequency spectrum is not below the set limit frequency the evaluating and control unit stores information indicating that the motor vehicle was not moved;
   a handset connected to the evaluating and control unit by which a breath alcohol concentration of a user is measured and is sent as a signal to the evaluating and control unit;
   a relay or switch activated by the evaluating and control unit for either interrupting or closing a circuit to a starter of the motor vehicle as a function of the signal by opening or closing a switch.

* * * * *